United States Patent
Rukavina et al.

(10) Patent No.: US 6,561,460 B2
(45) Date of Patent: May 13, 2003

(54) SWITCHABLE ELECTROCHROMIC DEVICES FOR USE IN AIRCRAFT TRANSPARENCY WINDOWS

(75) Inventors: Thomas G. Rukavina, New Kensington, PA (US); Chia-Cheng Lin, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/919,152

(22) Filed: Jul. 31, 2001

(65) Prior Publication Data

US 2002/0113168 A1 Aug. 22, 2002

Related U.S. Application Data

(60) Provisional application No. 60/222,771, filed on Aug. 3, 2000.

(51) Int. Cl.$^7$ ................................................. B64C 1/14
(52) U.S. Cl. ...................... 244/129.3; 359/265; 359/275
(58) Field of Search .......................... 244/129.3, 118.5, 244/119; 359/230, 265, 273, 275

(56) References Cited

U.S. PATENT DOCUMENTS

| | | | | |
|---|---|---|---|---|
| 4,201,351 A | | 5/1980 | Tolliver ........................ 242/56 |
| 4,268,126 A | | 5/1981 | Mumford .................... 350/331 |
| 4,554,713 A | | 11/1985 | Chabal ............................ 26/51 |
| 4,687,501 A | | 8/1987 | Reese ............................ 65/103 |
| 4,804,397 A | | 2/1989 | Stas et al. ..................... 65/107 |
| 5,111,329 A | * | 5/1992 | Gajewski et al. ........... 359/275 |
| 5,657,149 A | * | 8/1997 | Buffat et al. ................ 359/275 |
| 5,679,283 A | | 10/1997 | Tonar et al. ................. 252/583 |
| 5,864,419 A | | 1/1999 | Lynam ......................... 359/265 |
| 5,873,203 A | | 2/1999 | Thiel .............................. 52/172 |
| 5,985,184 A | | 11/1999 | Lynam ......................... 252/583 |
| 6,027,766 A | | 2/2000 | Greenberg et al. ........... 427/226 |
| 6,185,034 B1 | * | 2/2001 | Nakamura et al. .......... 359/265 |
| 6,211,994 B1 | | 4/2001 | Byker ........................... 359/272 |
| 6,249,369 B1 | | 6/2001 | Theiste et al. ............... 359/265 |
| 6,407,847 B1 | * | 6/2002 | Poll et al. .................... 359/275 |
| 2002/0075552 A1 | * | 6/2002 | Poll et al. .................... 359/275 |

FOREIGN PATENT DOCUMENTS

| EP | 0 299 687 | 1/1989 | ............ C03C/17/36 |
|---|---|---|---|
| EP | 0 867 752 A1 | 9/1998 | .............. G02F/1/15 |
| EP | 0 869 057 A2 | 10/1998 | .............. B64C/1/14 |

* cited by examiner

Primary Examiner—Michael J. Carone
Assistant Examiner—Gabriel S Sukman
(74) Attorney, Agent, or Firm—Andrew C. Siminerio (57) ABSTRACT

An electrochromic aircraft window assembly includes: a) an outboard pane assembly; and b) a fog preventing electrochromic pane assembly spaced from the outboard pane assembly and defining a chamber therebetween, the fog preventing electrochromic pane assembly having: i) a first substrate having a first surface including a first conductive coating and a second surface including a second conductive coating; ii) a second substrate spaced from the first substrate, the second substrate having a first surface including a third conductive coating, the second surface of the first substrate and the first surface of the second substrate facing each other in spaced-apart relation to define a chamber therebetween; iii) an electrochromic medium contained in the chamber and in contact with the second and the third conductive coatings, the electrochromic medium having a luminous transmittance that varies upon application of an electrical potential through the electrochromic medium; iv) facilities for applying electrical current to the first conductive coating to heat the first conductive coating, thereby preventing fogging of the window assembly; and v) facilities for applying electrical current to the second and the third conductive coatings to establish the electrical potential through the electrochromic medium and vary the variable luminous transmittance of the electrochromic medium.

18 Claims, 3 Drawing Sheets

SWITCHABLE ELECTROCHROMIC DEVICES FOR USE IN AIRCRAFT TRANSPARENCY WINDOWS

This application claims the benefit of U.S. Provisional Application No. 60/222,771 filed Aug. 3, 2000.

The present invention relates to switchable electrochromic devices for use in windows for aircraft. More particularly, the present invention is directed to aircraft transparency windows which are anti-fogging and which have variable light transmittance.

The transmission of unwanted sound/vibrations through an aircraft transparency and into the aircraft, in particular the aircraft cabin, is undesirable and can cause discomfort to the cabin's occupants. Efforts have been made to reduce the transmission of sound/vibrations through aircraft transparencies. Such efforts have been generally directed to transparencies having several panes (e.g. four or more panes) maintained in spaced-apart relationship within a spacer-frame assembly, which spacer frame assembly is affixed to a corresponding opening in the body of the aircraft. The spaced panes provide a plurality of airspaces therebetween, which, among other things, reduce or eliminate the transmission of external sound/vibrations through the transparency into the cabin. Such transparencies may further include an electroconductive layer that can be heated upon application of electrical current thereto, thus providing an anti-fog characteristic to the aircraft window assembly.

Electrochromic devices have been proposed for a number of uses, such as architectural windows and automotive windows and mirrors. Such electrochromic devices typically include a sealed chamber defined by two pieces of glass that are separated by a gap or space that contains an electrochromic medium. The glass substrates typically include transparent conductive layers coated on facing surfaces of the glass and are in contact with the electrochromic medium. The conductive layers on both glass substrates are connected to electronic circuitry that is effective to electrically energize the electrochromic medium and change the color of the medium. For example, when the electrochromic medium is energized, it may darken and begin to absorb light.

Electrochromic devices have most commonly been used in rear-view mirrors for automotive applications. In such uses, a photocell can be incorporated into the electrochromic cell to detect a change in light reflected by the mirror. When a specific level of light is reflected, for instance when lights are reflected at night, the photocell is activated to apply an electrical potential to the electrodes in the cell, thus causing the electrochemical medium to change color and create a darkening affect, thereby dimming the mirror to the lights. Electrochemical devices have also been considered for use in other automotive applications, such as windshields and windows, as well as architectural applications such as building windows.

It has been proposed to add an electrochromic assembly on the inside of a conventional curved outer window. Such an aircraft window adds significant weight to the overall aircraft structure. Moreover, the additional substrates and electrochromic assembly reduce the light transmittance and increase the reflective distortion of the aircraft window.

As can be appreciated, it would be advantageous to provide an aircraft window assembly which provides anti-fogging properties, which reduces or eliminates unwanted sound, which is capable of varying light transmittance, which reduces reflective distortion, and which minimizes additional weight to the aircraft.

The present invention provides an electrochromic aircraft window assembly comprising: a) an outboard pane assembly; and b) a fog preventing electrochromic pane assembly spaced from said outboard pane assembly and defining a chamber therebetween, said fog preventing electrochromic pane assembly comprising: i) a first substrate having a first surface including a first conductive coating and a second surface including a second conductive coating; ii) a second substrate spaced from said first substrate, said second substrate having a first surface including a third conductive coating, said second surface of said first substrate and said first surface of said second substrate facing each other in spaced-apart relation to define a chamber therebetween; iii) an electrochromic medium contained in said chamber and in contact with said second and said third conductive coatings, said electrochromic medium having a luminous transmittance that varies upon application of an electrical potential through said electrochromic medium; iv) facilities for applying electrical current to said first conductive coating to heat said first conductive coating, thereby preventing fogging of said window assembly; and v) facilities for applying electrical current to said second and said third conductive coatings to establish said electrical potential through said electrochromic medium and vary said variable luminous transmittance of said electrochromic medium.

The present invention also provides an electrochromic aircraft window assembly comprising: a) an outboard pane assembly; b) an electrochromic pane assembly comprising first and second spaced substrates defining a chamber therebetween and an electrochromic medium contained in said chamber, said electrochromic medium having a luminous transmittance that varies upon application of an electrical potential through said electrochromic medium; and c) an intermediate pane assembly having anti-fogging properties, wherein said outboard pane assembly and said electrochromic pane assembly have facing surfaces and said intermediate pane assembly is interposed between and spaced from said outboard pane assembly and said electrochromic pane assembly, said intermediate pane assembly preventing fogging of said respective facing surfaces of said outboard pane assembly and said electrochromic pane assembly.

The present invention further provides an electrochromic aircraft window assembly comprising: a) an outboard pane assembly; b) a vibration dampening/sound absorbing pane assembly comprising a laminate comprising a base substrate, an adhesive interlayer deposited over a surface of said base substrate, a sound dampening material layer deposited over said adhesive interlayer and adhered to said base substrate by said adhesive layer, and a first conductive coating interposed between said adhesive layer and said base substrate; c) an electrochromic pane assembly comprising a first substrate having a second conductive coating on a surface thereof and a second substrate having a third conductive coating on a surface thereof, said first and said second substrates spaced from each other with said second and said third conductive coatings facing each other to define a chamber therebetween, said electrochromic pane assembly further comprising an electrochromic medium contained in said chamber, said electrochromic medium having a luminous transmittance that varies upon application of electrical current to said second and said third conductive coatings to establish an electrical potential through said electrochromic medium; and d) a spacer frame assembly for retaining said outboard pane assembly, said vibration dampening/sound absorbing pane assembly and said electrochromic pane assembly in spaced-apart generally parallel facing relationship with said vibration dampening/sound absorbing pane assembly positioned between said outboard pane assembly and said electrochromic pane assembly, said spacer frame assembly providing a first chamber between said outboard pane assembly and said vibration dampening/sound absorbing pane assembly and second chamber between said vibration dampening/sound absorbing pane assembly and said electrochromic pane assembly.

The present invention also provides an electrochromic aircraft window assembly comprising: a) an outboard pane assembly; and b) electrochromic pane assembly spaced from said outboard pane assembly and defining a chamber therebetween, said electrochromic pane assembly comprising: i) a first substrate having first and second surfaces; ii) second substrate having first and second surfaces, wherein said second surface of said first substrate is facing and spaced from said first surface of said second substrate, said first and second substrates forming a chamber of generally uniform thickness therebetween and further comprising a first conductive layer on said second surface of said first substrate and a second conductive layer on said first surface of said second substrate; iii) an electrochromic medium contained in said chamber and in contact with said conductive layers, said electrochromic medium having a luminous transmittance that varies upon application of an electrical potential through said electrochromic medium; iv) at least one additional assembly selected from a distortion reducing assembly, a fogging reducing assembly and a sound dampening assembly; and v) facilities for applying electrical current to said first and said second conductive layers to impress said electrical potential through said electrochromic medium and vary said luminous transmittance of said electrochromic medium.

The foregoing summary, as well as the following detailed description of embodiments of the invention, will be better understood when read in conjunction with the appended drawings. In the drawings.

The present invention is directed to an aircraft window assembly incorporating electrochromic principles. In one nonlimiting embodiment of the present invention, the aircraft window assembly includes a first pane assembly and a second pane assembly spaced from the first pane assembly, providing a space or chamber therebetween. The second pane assembly is a fog preventing assembly and includes a first transparent substrate coated on one side with a first transparent electrically conductive coating capable of being heated to prevent fogging of the assembly. The second pane assembly is also an electrochromic assembly, and includes a second transparent substrate spaced from the first substrate to define a chamber therebetween, with an electrochromic medium contained in the chamber. The first substrate of the second pane assembly forms a first pane of the electrochromic cell, and includes a second transparent electrically conductive coating on a surface thereof. The second substrate includes a third transparent electrically conductive coating on a surface thereof, with the second conductive coating and the third conductive coating facing each other within the electrochromic cell. Application of an electrical current to the first conductive coating heats the first conductive coating and the chamber between the pane assemblies to prevent fog in the window assembly. Application of an electrical current to the second and third conductive coatings impresses an electrical potential between the second and third coatings and through the electrochromic medium, which in turn causes the electrochromic medium to change color, thereby causing light transmittance of the window assembly to change or vary, e.g. reduce the light transmittance. As used herein, the terms "light transmittance" and "luminous transmittance" mean the measure of the total amount of visible light transmitted through a transparency or window assembly. The luminous transmittance data provided in this specification is measured for CIE standard illuminant A and indicted as LTA.

For the purposes of this specification, unless otherwise indicated, all numbers expressing quantities such as dimensions, thicknesses, luminous transmittance and so forth used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Figure 1:
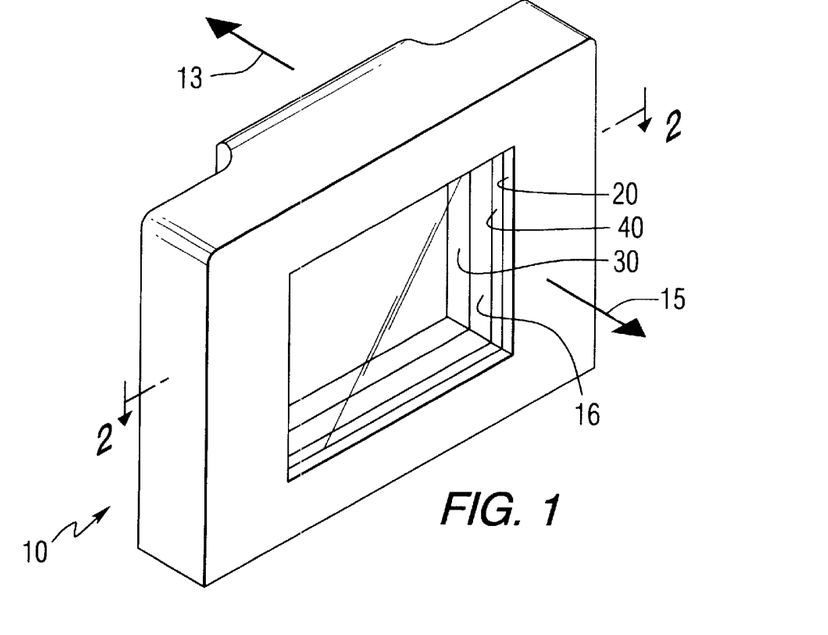
FIG. 1 is a perspective view of a multiple-glazed electrochromic aircraft window assembly incorporating features of present invention, with portions removed for clarity.
Figure 2:
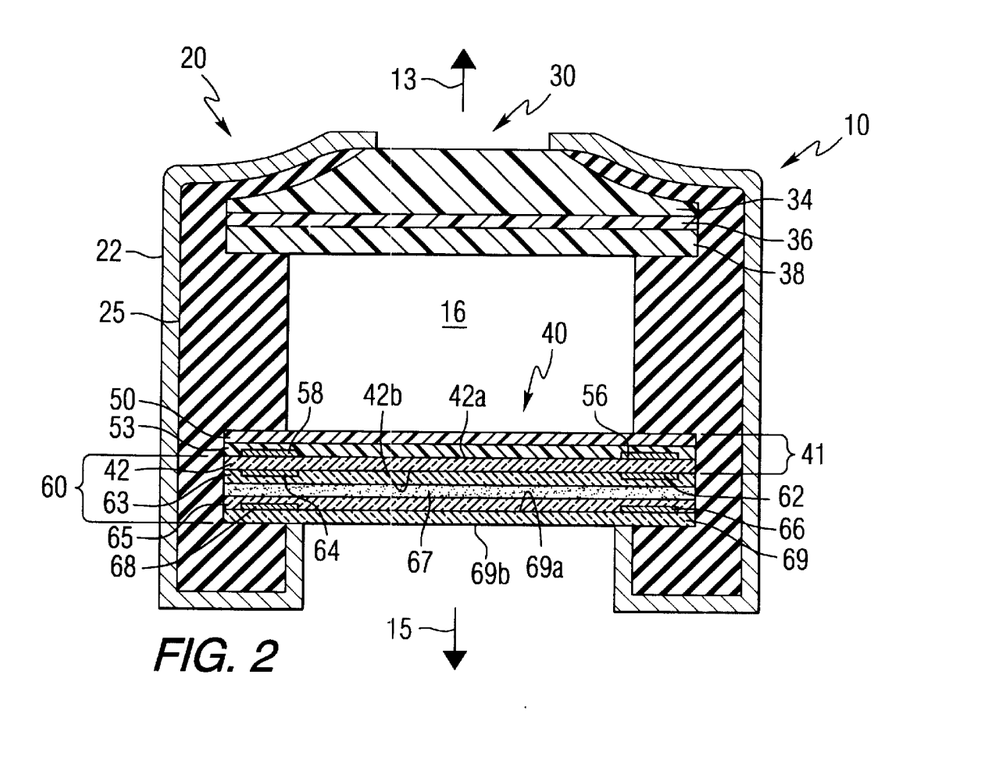
FIG. 2 is a cross-sectional view of the aircraft window assembly of FIG. 1 taken along line 2—2 of FIG. 1.

In the following description, like elements bear like reference numerals. Referring to FIGS. 1 and 2, electrochromic aircraft window assembly 10 is shown. The outboard direction of the aircraft relative to window assembly 10 is shown by arrow 13, and the inboard direction of the aircraft into which the assembly is mounted relative to window assembly 10 is shown by arrow 15. It is noted that reference to outboard or outer surfaces and inboard or inner surfaces as discussed herein is relative to the directions as shown by such arrows.

Window assembly 10 includes an outboard pane assembly 30 held in spaced-apart substantially parallel facing relationship with a fog preventing electrochromic pane assembly 40 by a spacer frame assembly 20, forming first space or chamber 16 therebetween. As may be appreciated, spacer frame assembly 20 is not limiting in the present invention and can be of any of several types known in the art. The spacer frame assembly 20 shown in FIG. 2 includes an optional frame 22 that surrounds a gasket 25. The gasket 25 can be any gasket material known in the art to hold outboard pane assembly 30 in spaced apart relationship from fog preventing electrochromic pane assembly 40. In one nonlimiting embodiment of the present invention, the gasket material is rubber. The frame 22 can be made of any structurally stable material, such as but not limited to a metal, e.g., aluminum, and operates to protect gasket material 25 from damage and provide additional structural stability to window assembly 10. The gasket 25, frame 22 and pane assemblies 30 and 40 are assembled in any convenient manner to provide the window assembly 10.

The chamber 16, among other things, provides thermal insulation between the atmosphere external of the aircraft cabin and the atmosphere within the cabin. In one nonlimiting embodiment of the invention, chamber 16 is in fluid communication with the atmosphere external of the chamber (i.e. an unsealed unit). This type of configuration prevents a pressure build-up within the chamber 16 during flight. In another nonlimiting embodiment, chamber 16 is not in fluid communication with the atmosphere external of the chamber (i.e. a sealed unit).

Whether a sealed or unsealed unit, it is desirable to ensure that the chamber 16 remains free of moisture, and a desiccant can be associated with chamber 16 for that purpose, in any manner known in the art. In lieu of, or in addition to the desiccant, one or more of the surfaces of the aircraft transparency in contact with chamber 16 can be coated with functional coatings, e.g. coatings to remove moisture or surface contaminants, such as but not limited to photocatalytically-activated, self-cleaning coatings as described in U.S. Pat. No. 6,027,766 entitled "PHOTOCATALYTICALLY-ACTIVATED SELF-CLEANING ARTICLE AND METHOD OF MAKING SAME", in the name of Greenberg et al., or photoelectrolytically-desiccating coatings as described in U.S. Pat. No. 5,873,203 entitled "PHOTOELECTROLYTICALLY-DESICCATING MULTIPLE-GLAZED WINDOW UNITS", in the name of James P. Thiel, each of which is hereby incorporated herein by reference.

Where chamber 16 is sealed, the space can be fully or partially filled with an insulating gas such as but not limited to air, argon, krypton or mixtures thereof.

While the dimensions of assembly 10 are not limiting to the invention provided, in one nonlimiting embodiment, for aircraft window assemblies having overall dimensions of approximately 20 inches (51 cm) in width by 25 inches (64 cm) in height and an overall thickness in the range of 1.5 to 2.5 inches (3.8 to 6.4 cm), a chamber 16 thickness in the range of 1.0 inch (2.54 cm) to 2.0 inches (5.08 cm) is acceptable.

Outboard pane assembly 30 can be a monolithic piece or it can be a laminate piece. The laminate piece can include laminates of two or more panes of glass and/or plastic, which can additionally include one or more interlayers disposed between the panes, or the laminate can include the combination of a single pane and one or more interlayer materials laminated thereon to form the outboard pane assembly 30. Glass panes useful in the present invention can be chemically or thermally tempered. In one particular nonlimiting embodiment of the present invention, the glass pane is chemically tempered glass available from PPG Industries, Inc., of Pittsburgh, Pa., under the trademark Herculite™ II. This glass has an extremely high strength to weight ratio, allowing the glass substrate to be thinner and lighter than thermally tempered glass without compromising strength or optics. Suitable plastic panes include, but are not limited to cast acrylics, stretched acrylics, and polycarbonates. Suitable interlayer materials include, but are not limited to polyvinyl butyral, urethanes, silicones and combinations thereof.

Figure 5:
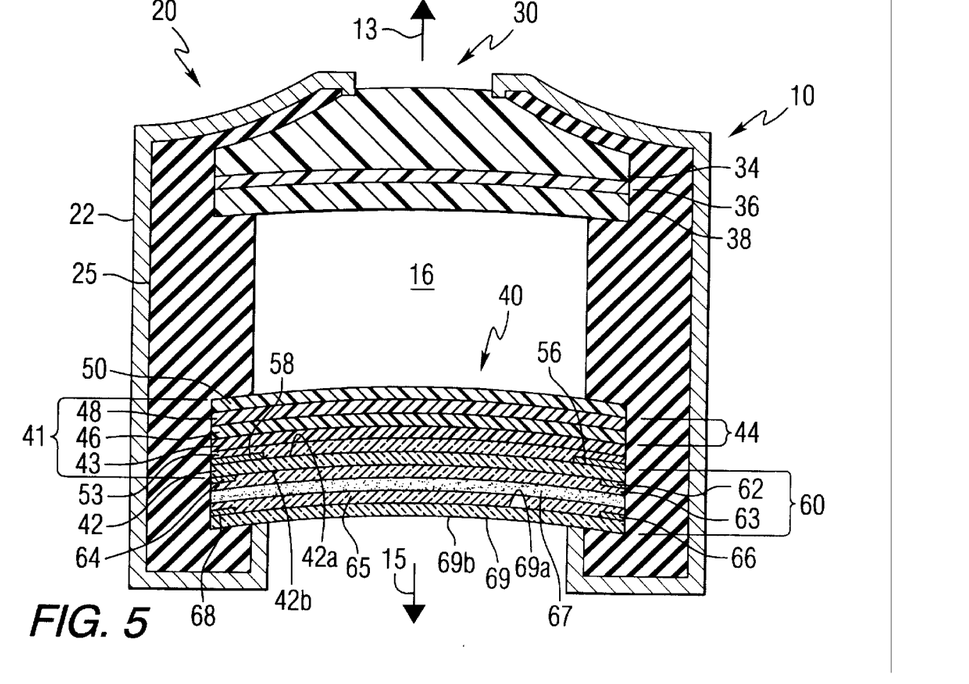

Outboard pane assembly 30 can be flat as shown in FIG. 2, or it can include one or more curved surfaces including convex and concave curved surfaces, as depicted in FIG. 5 and discussed further herein. Additionally, outboard pane assembly 30 can include one or more films or coatings deposited on one or more surfaces in order to provide the aircraft transparency with a wide variety of performance characteristics, such as but not limited to anti-reflecting coatings, ultraviolet absorbing coatings, electromagnetic radiation shielding coatings, and anti-abrasion coatings.

In the particular nonlimiting embodiment shown in FIG. 2, outboard pane assembly 30 includes a first acrylic ply 34 adhered by an interlayer 36 to a second acrylic ply 38. Although not required, the acrylic plies can be stretched acrylic plies. The interlayer 36 bonds the two acrylic plies 34 and 38 together to provide an assembly 30 that has less deflection due to aircraft pressurization and correspondingly improved service life. The multilayered configuration also provides fail-safe capability since each of plies 34 and 38 are designed to withstand the rigors of flight should the other ply fail in service. In one nonlimiting embodiment, interlayer 36 is plasticized polyvinyl butyral. When outboard pane assembly 30 is a laminate including one or more convex or concave surfaces, the interlayer 36 can be differentially stretched, e.g. as disclosed in U.S. Pat. Nos. 4,201,351 and 4,554,713, both of which are herein incorporated by reference. Plies 34 and 38 can be of any thickness, however, as can be appreciated by those skilled in the art, increasing the thickness of plies 34 and 38, beyond that needed to withstand the rigors of flight, undesirably increases the weight of outboard pane assembly 30. For example and without limiting the present invention, for many applications, a thickness for ply 34 ranging from 0.20 to 0.40 inches (0.51 to 1.02 cm), a thickness for ply 38 ranging from 0.20 to 0.40 inches (0.51 to 1.02 cm), and a thickness for interlayer 36 ranging from 0.025 to 0.05 inches (0.06 to 0.13 cm) is acceptable to withstand the rigors of flight and provide the above-described capabilities. In one particular nonlimiting embodiment, ply 34 has a thickness ranging from 0.31 to 0.40 inches (0.79 to 1.02 cm).

With continued reference to FIG. 2, fog preventing electrochromic pane assembly 40 of the present invention is a laminated structure, including two distinct portions, an anti-fog assembly portion 41 and an electrochromic assembly portion 60. Anti-fog assembly portion 41 of fog preventing electrochromic pane assembly 40 includes a base substrate 42 over which is deposited a first conductive coating 53. Although not required, an abrasion resistant coating 50 can be provided over first conductive coating 53. Such abrasion resistant coating can be, for example, polyethylene terephthalate. In the nonlimiting alternate embodiment shown in FIG. 3, an adhesive interlayer 43 is provided over first conductive coating 53, over which is deposited a sound dampening material layer 44. Adhesive interlayer 43 adheres sound dampening material layer 44 to substrate 42 with first conductive coating 53 arranged therebetween, while sound dampening material layer 44, in combination with the adhesive interlayer 43, reduces or eliminates or assists in the reduction or elimination of the transmission of sound/vibrations through window assembly 10.

The base substrate 42 can be any transparent substrate compatible with the rigors of flight and which cooperates with interlayer 43 and sound dampening material layer 44 to reduce or eliminate the transmission of sound/vibrations through window assembly 10. The substrate 42 can be a monolithic piece or it can be a laminate piece. When the substrate 42 is a laminate piece, it can include two or more panes, which can additionally include one or more interlayers disposed between the panes, or the laminate piece can include the combination of a single pane and one or more interlayers laminated together to form the substrate 42. Suitable panes for either a monolithic or a laminate substrate 42 include, for example, panes of either glass or plastic. The glass panes can be chemically or thermally tempered. In one particular nonlimiting embodiment of the present invention, the glass pane is chemically tempered glass available from PPG Industries, Inc. under the trademark Herculite™ II, as discussed earlier. Suitable plastic panes include, but are not limited to cast acrylics, stretched acrylics, and polycarbonates. Suitable interlayer materials include, but are limited to polyvinyl butyral, urethanes, silicones, and combinations thereof.

Substrate 42 can further include functional coatings such as, but not limited to, infrared radiation attenuating coatings, ultraviolet radiation attenuating coatings and antireflective coatings.

Substrate 42 can be flat as shown in FIG. 2, or can include one or more curved surfaces, including concave and/or convex surfaces as shown in FIG. 5 will be discussed later. The thickness of substrate 42 is not limiting in the invention, provided the material from which it is formed, and the selected thickness, cooperate with adhesive interlayer 43 and sound dampening material layer 44 to provide the desired or required degree of vibration dampening/sound absorption. As can be appreciated by those skilled in the art, increasing the thickness of the substrate 42 beyond the foregoing, undesirably increases the weight of the transparency. In one nonlimiting embodiment of the invention where the substrate 42 is formed of Herculite™ II chemically tempered glass, a glass thickness in the range of 0.06 to 0.12 inches (0.15 to 0.30 cm), when combined with the polyvinyl butyral adhesive interlayer and SpallShield™ sound dampening material layer described below, has been found to be acceptable for many applications.

Adhesive interlayer 43 can be formed by any material that is capable of adhering the layers of the structure. Examples include, but are not limited to, one or more sheets of materials selected from plasticized polyvinyl butyral, urethane, or combinations thereof. Where substrate 42 includes convex or concave surfaces, the adhesive interlayer 43 may be differentially stretched, e.g., as disclosed in U.S. Pat. Nos. 4,201,351 and 4,554,713. In one nonlimiting embodiment of the present invention, adhesive interlayer 43 is polyvinyl butyral because it has been found to be fully compatible with a SpallShield™ sound dampening material layer 44 disposed thereover, as discussed below. The thickness of adhesive interlayer 43 is not limiting in the invention, however, it should be sufficient to adhere sound dampening material layer 44 to substrate 42 and to cooperate with substrate 42 and sound dampening material layer 44 to provide the desired vibration dampening/sound absorbing capabilities. Although not meant to be limiting in the present invention, a thickness for adhesive interlayer 43 ranging from 0.02 to 0.03 inches (0.05 to 0.08 cm) has been found to be acceptable for many applications.

The sound dampening material layer 44 of the present invention can be any sound dampening material which cooperates with adhesive interlayer 43 and substrate 42 to provide a desired or required degree of vibration dampening/sound absorption. As used above, "cooperate" means, among other things, that the sound dampening material layer 44 is adhered to the substrate 42 by the adhesive interlayer 43, and remains so during the rigors of flight, while providing an acceptable level of vibration dampening/sound absorption.

Figure 3:
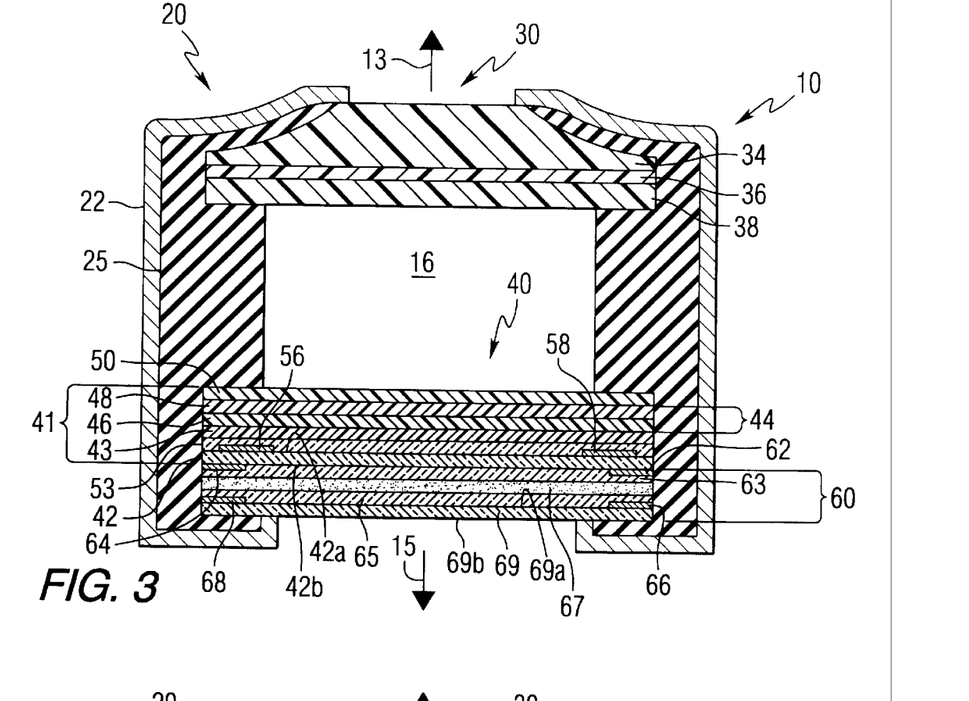
FIGS. 3–5 are cross-sectional views similar to the view of FIG. 2 illustrating alternate embodiments of a multiple glazed electrochromic aircraft window assembly incorporating features of the present invention.

In one nonlimiting embodiment of the present invention, sound dampening material layer 44 is a laminate that includes a polyvinyl butyral base layer 46 over which is adhered a layer of polymer 48, e.g., polyester, to provide a vibration dampening/sound absorbing laminate. Although not required, an abrasion resistant coating 50 can be provided over the polymer 48, as shown in FIG. 3. Coating 50 can be part f the sound dampening material layer 44 or it can be applied separately to the fog preventing electrochromic pane assembly 40.

Such a sound dampening laminate is available from the DuPont De Nemours Corporation of Wilmington, Del., (hereinafter "DuPont") under the trademarks "SentryGlas™" and/or "SpallShield™". The SentryGlas multi-layer composite laminate is marketed by DuPont as a plastic composite material that is laminated to glass to produce vandal and burglary resistant glass. More particularly, the DuPont SentryGlas multi-layer composite operates to prevent spalling, which is the shower of razor-sharp glass pieces that occurs opposite the side of impact when a glass pane, particularly an annealed glass pane, is broken.

In one nonlimiting embodiment of the present invention, 3010 SentryGlas multi-layer composite, which includes a 30 mil thick polyvinyl butyral base layer 46 and a 10 mil thick polyester layer 48, has been found to provide an acceptable sound dampening material layer. The mechanism by which the arrangement of components of the present invention interacts to produce a vibration dampening/sound absorbing aircraft transparency is not yet completely understood; however, the vibration dampening/sound absorbing benefits have been realized.

As indicated, anti-fog assembly portion 41 of fog preventing electrochromic pane assembly 40 includes first conductive coating 53 positioned on surface 42a of substrate 42. First conductive coating 53 is a transparent electroconductive coating, providing fog preventing electrochromic pane assembly 40 with a heating pane. Facilities 56 and 58 (e.g., bus bars and lead wires as explained in more detail below) are in electrical contact with first conductive coating 53 and spaced from one another, to pass electrical current through first conductive coating 53 and heat the coating so as to remove or prevent the accumulation of moisture and fog, particularly on the surfaces of outboard pane assembly 30 and fog preventing electrochromic pane assembly 40 in contact with first chamber 16. In one nonlimiting embodiment, facilities 56 and 58 are adhered to the substrate 42, and first conductive coating 53 is provided over substrate 42 and facilities 56 and 58. In another nonlimiting embodiment, coating 53 is applied to substrate 42 and facilities 56 and 58 are adheres to coating 53.

Conductive coating 53 can be any material that is substantially transparent to visible light; bonds well to the substrate surfaces; is resistant to corrosion by any materials within the electrochromic device as well as the atmosphere; and has good electrical conductance. Although not required, transparent conductive coating 53 is typically includes one or more metal or metal oxide coatings, such as but not limited to silver, gold, tin oxide, indium tin oxide (ITO), fluorine-doped tin oxide (FTO), antimony-doped tin oxide, ITO/metal/ITO (IMI), and combinations thereof, as well as any other materials known in the art. Conductive coating 53 can be applied by any of several well known methods, including pyrolysis, chemical vapor deposition and magnetron sputtering. In one particular nonlimiting embodiment of the present invention, the coating 53 is a tin oxide conductive coating. Without limiting the present invention, useful coatings include an electrically conductive fluorine-doped tin oxide coated glass available from PPG Industries, Inc. of Pittsburgh, Pa., and marketed under the trademark "NESA®", and an electrically conductive indium tin oxide coated glass available from PPG Industries, Inc., and marketed under the trademark "NESATRON®". Indium tin oxide coated glass combines the durability of fluorine doped tin oxide coated glass with the efficiencies of providing defogging and deicing properties while operating at lower voltages.

In one nonlimiting embodiment of the present invention, transparent conductive coating 53 has a sheet resistance of at least 20 ohms per square, e.g. ranging from 25 to 40 ohms per square. Further, the thickness of conductive coating 53 can be uniform, i.e. it has the same general thickness throughout, or can vary over surface 42a of substrate 42 to accommodate varying distances between facilities 56 and 58 to promote uniform heating. For example, where substrate 42 includes a convex or concave surface, the facilities 56 and 58 can be in closer proximity to each other over certain portions of the substrate 42 and further apart in others. When in closer proximity, conductive coating 53 between the facilities 56 and 58 can be made thinner and conversely, where facilities 56 and 58 are spaced furthest apart, conductive coating 53 can be made thicker to provide uniform heating of conductive coating 53 in the presence of the applied electrical current. In one nonlimiting embodiment of the present invention, the thickness of conductive coating 53 on substrate 42, regardless of whether coating 53 has a uniform thickness or a varying thickness, ranges from 200 Å to 3,500 Å, e.g. from 200 Å to 1,300 Å.

As indicated, fog preventing electrochromic pane assembly 40 includes both anti-fog assembly portion 41 and electrochromic assembly portion 60. Electrochromic cells, as known in the art, typically include two spaced apart substrates, usually glass, with facing surfaces of the substrates coated with a conductive coating, and including an electrochromic medium therebetween. In the embodiment of the invention shown in FIG. 2, an electrochromic cell is defined by anti-fog assembly portion 41 acting as the first substrate, and electrochromic assembly portion 60 acting as the remainder of the electrochromic cell.

It is contemplated by the present invention that the additional layers added to anti-fog assembly portion 41 for the electrochromic assembly portion 60 can add sound absorption and vibration dampening to the aircraft window assembly. In particular, since electrochromic assembly portion 60 includes various layers such as the electrochromic medium as will be discussed in more detail, additional sound dampening of the window assembly is achieved. As such, the embodiment of the present invention shown in FIGS. 2 to 5 can further add to the sound absorption and vibration dampening of the window assembly. Further, the conductive coatings included in the electrochromic assembly portion 60 can include specific sheet resistances that can act as a shield for electromagnetic radiation.

Anti-fog assembly portion 41, as discussed in detail above, includes base substrate 42 as a substrate material over which the remaining layers are adhered. In the particular nonlimiting embodiment of the invention shown in FIG. 2, this anti-fog assembly portion 41 also acts as the first substrate for the electrochromic cell, with base substrate 42 acting as the substrate surface to which an electroconductive coating of the electrochromic cell is applied, as will be discussed in more detail herein.

Electrochromic assembly portion 60 includes second substrate 69 spaced generally parallel from base substrate 42 of anti-fog assembly portion 41. Second substrate 69 can be made of any material known in the art for use in electrochromic devices. For example, such substrates can be made from polymeric materials, glass, and the like.

As discussed earlier, substrate 42 includes outer first surface 42a having first conductive coating 53 thereon, which first conductive coating can be heated through application of electrical current in order to prevent fogging of electrochromic window assembly 10. Base substrate 42 further includes inner second surface 42b, which surface faces second substrate 69 of electrochromic assembly portion 60. Inner second surface 42b of base substrate 42 is provided with a second conductive coating 63 thereon. Further, second substrate 69 includes first outer surface 69a which is provided with a third conductive coating 65 thereon, which third conductive coating 65 is spaced from second conductive coating 63 to provide a chamber therebetween. Second inner surface 69b of second substrate 69 represents the innermost portion of window assembly 10.

Second conductive coating 63 and third conductive coating 65 are transparent electroconductive coatings similar to first conductive coating 53 as discussed above, albeit serving a different distinct purpose, as will be discussed. Second conductive coating 63 and third conductive coating 65 can be the same or different material, and can be the same as or different from first conductive coating 53. Although not required, in one nonlimiting embodiment, first conductive coating 53, second conductive coating 63, and third conductive coating 65 are a transparent metal or metal oxide, e.g. an indium tin oxide coating, as discussed in detail with respect to anti-fog assembly portion 41 above. Electrochromic assembly portion 60 is provided with facilities 62 and 64 in electrical contact with second conductive coating 63, as well as facilities 66 and 68 in electrical contact with third conductive coating 65. Such facilities function in a similar manner to facilities 56 and 58, as discussed with respect to first conductive coating 53, and can be, e.g. bus bars and lead wires. Facilities 62, 64, 66 and 68 direct electrical current to second and third conductive coatings 63 and 65, respectively.

In one nonlimiting embodiment of the invention, conductive coatings 63 and 65 have a sheet resistance ranging from 1 to 10 ohms per square, e.g. ranging from 2 to 5 ohms per square. Further, the thickness of conductive coatings 63 and 65 can be the same or different relative to each other and the coating thickness can be uniform, i.e. the same general thickness throughout, or nonuniform, i.e. the coating thickness varies. In one nonlimiting embodiment of the present invention, coatings 63 and 65 have the same generally uniform thickness, ranging from 5,000 Å to 60,000 Å, e.g. from 13,000 Å to 35,000 Å.

As indicated, second conductive coating 63 and third conductive coating 65 are spaced apart to define a chamber or space therebetween. Electrochromic medium 67 is contained within this chamber or space. Electrochromic medium 67 can be any type of material as is known in the art, and can be in any known form, such as but not limited to, electrochromic liquids, solutions, gels, semi-solid materials, polymeric materials, and the like. Electrochromic medium 67 includes at least one electrochromic compound or dye that defines a color. Such materials are well known in the art to color to successively darker colors or shades as greater electrical potential is applied through the electrochromic medium. This in turn reduces the luminous transmittance of electrochromic assembly portion 60. In one nonlimiting embodiment, when the electrical potential is turned off or reversed, the coloring is bleached, i.e. returns to is original color, allowing full transmittance of light through electrochromic medium 67.

In one nonlimiting embodiment of the present invention, electrochromic medium 67 is a solution-phase type electrochromic medium, in which a material contained in solution in an ionically conducting electrolyte remains in solution in the electrolyte when electrochemically reduced or oxidized (including a gel). In another nonlimiting embodiment, electrochromic medium 67 is a surface-confined electrochromic medium, in which a material which is attached directly to an electronically conducting electrode, or confined in close proximity thereto, remains attached or confined when electrochemically reduced or oxidized. In still another nonlimiting embodiment, electrochromic medium 67 is an electrodeposition-type electrochromic medium, in which a material contained in solution in the ionically conducting electrolyte forms a layer on the electronically conducting electrode when electrochemically reduced or oxidized.

Electrochromic medium 67 includes at least one anodic electrochromic compound and at least one cathodic electrochromic compound, with the anodic compound representing an oxidizable material and the cathodic compound representing a reducible material. Upon application of electrical potential to the electrochromic medium, the anodic electrochromic compound oxidizes and the cathodic electrochromic compound correspondingly reduces. Such oxidation and reduction results in a change in the absorption coefficient at least one wavelength in the visible spectrum when electrochemically activated. The combination of such anodic and cathodic electrochromic compounds in electrochromic medium 67 defines the color associated therewith upon application of an electrical potential. Such cathodic electrochromic compounds are commonly referred to as viologen dyes, and such anodic electrochromic compounds are commonly referred to as phenazine dyes.

Electrochromic medium 67 can also include other materials such as but not limited to, solvents, light absorbers, light stabilizers, thermal stabilizers, antioxidants, thickeners, viscosity modifiers, and similar materials.

As indicated, first conductive coating 53 includes facilities 56 and 58, second conductive coating 63 includes facilities 62 and 64, and third conductive coating 65 includes facilities 66 and 68. The facilities 56, 58, 62, 64, 66 and 68 include, but are not limited to, bus bars which can be mounted along longitudinal edges of outer first surface 42a of base substrate 42 (with respect to first conductive coating 53), along the longitudinal edges of inner second surface 42b of base substrate 42 (with respect to second conductive coating 63), and along longitudinal edges of outer first surface 69a of second substrate 69 (with respect to third conductive coating 65), respectively. Where bus bars are used, they can be secured to the substrate surfaces by any manner known in the art that produces a strong and durable bond between bus bars and the substrate surfaces. Without limiting the present invention, in an embodiment where the substrates are glass, bus bars comprised of silver or a silver-containing ceramic paint can be bonded to the glass surface in any manner known by those skilled in the art. Silk screening a silver-containing paint followed by curing with heat provides a nonlimiting example of one process by which silver-containing bus bars can be bonded to a glass substrate. While the dimensions of the facilities 56, 58, 62, 64, 66 and 68 will vary with the dimensions of the transparency as can be appreciated by those skilled in the art, without limiting the present invention, silver bus bars ranging from 0.002 to 0.008 inches (0.005 to 0.02 cm) in thickness are acceptable for most applications. In another nonlimiting embodiment, the bus bars can be a metal foil, e.g. copper foil, that are secured to the conductive coating by an electrically conductive adhesive.

In order to deliver electrical current to conductive coatings 53, 63 and 65, in one nonlimiting embodiment of the present invention, a lead wire (not shown) is connected, e.g. by soldering, to each bus bar, and each lead wire in turn is connected to an electrical power source. In this manner, the electrical current delivered to the bus bars 56 and 58 and passing through first conductive coating 53 heats first conductive coating 53 due to the electrical resistance of the coating to remove fog, ice, frost, and the like, that forms on window assembly 10. In addition, the electrical potential established between second conductive coating 63 and third conductive coating 66 due to the current delivered the coatings by bus bars 62, 64, 66 and 68 causes corresponding oxidation and reduction of the compounds of electrochromic medium 67, thus causing the light transmittance of electrochromic medium 67 to vary, as discussed above.

The power supplied to coatings 53, 63 and 65 can be from a single source or multiple sources. More particularly, if the power source supplies direct current, coating 53 of the fog preventing assembly portion 41 and coatings 63 and 65 of the electrochromic portion 60 of fog preventing electrochromic pane assembly 40 can be powered by the same source. However, since the electrochromic assembly needs to be powered by direct current, if coating 53 is powered by an alternating current, coatings 63 and 65 need to be powered by a separate DC power source.

As can be appreciated, the power density required to heat first conductive coating 53 is different than the power density required to cause oxidation and reduction of the electrochromic compounds in the electrochromic medium 67 through second and third conductive coatings 63 and 65. In one nonlimiting embodiment, the electrical current is applied to first conductive coating 53 at a power density of at least 0.25 watts per square inch, e.g. in the range of 0.25 to 0.40 watts per square inch, to prevent fogging of window assembly 10. In another nonlimiting embodiment, the electrical current is applied to first conductive coating 53 at a power density of at least 0.35 watts per square inch. With respect to coatings 63 and 65, in one nonlimiting embodiment, the electrical current is applied to these coatings at a power density ranging from 0.0001 to 0.01 watts per square inch, e.g. from 0.0001 to 0.003 watts per square inch, to impress an appropriate electrical potential through the electrochromic medium 67 and cause the light transmittance of the electrochromic medium 67 to vary. In still another nonlimiting embodiment, the electrical current is applied to first conductive coating 53 at a power density of at least 0.25 watts per square inch and the electrical current is applied to second conductive coating 63 and third conductive coating 65 at a power density ranging from 0.0001 to 0.01 watts per square inch.

As indicated, the luminous transmittance of the electrochromic medium 67 varies upon application of an electrical potential thereto, i.e. the luminous transmittance of the medium changes based on the presence or absence of an electrical potential therethrough, as well as the magnitude of the potential. The electrochromic window assembly can be selectively activated to change the transmittance through the electrochromic medium by applying the electrical potential and causing the dye of the electrochromic medium to color. In this manner, the electrochromic window assembly can be switchable between one level of transmittance when no electrical potential is applied, and a second level of transmittance, when electrical potential is applied. In one nonlimiting embodiment, such change in coloring between the energized and nonenergized states is self-erasable, i.e. it is switchable between an electrochemically activated state, where the electrochromic medium color changes upon application of the electrical potential, and an electrochemically non-activated state, where the electrochromic medium automatically returns or erases to its original color, e.g. a colorless state, when the electrical potential is removed. This feature is most easily accomplished by providing a switch or some other controller for selectively applying electrical current to the window assembly. In should be appreciated that the original state can be a colorless state or it can have a color or tint.

In a further nonlimiting embodiment, the electrochromic window assembly is switchable and non-self-erasing, i.e. application of the electrical potential causes the electrochromic medium to color, and the electrochromic medium will remain in the colored state until the electrical potential is reversed or shorted.

The color of the dye can be a uniform darkness or shade upon application of an electrical potential, or it can be of varying degrees of darkness or shading resulting from varying the electrical potential. More particularly, specific coloring or shading of the coloring can be varied over a range of voltages and power densities. Upon application of a low power density to the electrochromic medium, the dye can begin to color. Increasing the voltage will increase the magnitude of the electrical potential applied through the electrochromic medium, thus causing the color of the dye to darken to a deeper shade or intensity. In this manner, the window assembly can include varying degrees of light transmittance upon varying of the electrical potential. The window assembly can therefore be adjusted to a desired level of darkness or shading based upon the amount of electrical potential applied through the electrochromic medium 67. This can be easily accomplished, for example, by incorporating a switch or some other controller between the source of electricity and the window assembly. Although not to be limiting in the present invention, in one particular embodiment, the luminous transmittance (LTA) of the electrochromic assembly portion 60 of the fog preventing electrochromic pane assembly 40 varies from a minimum LTA ranging from 1 percent to 20 percent and a maximum LTA ranging from 60 to 80 percent. As such, the electrochromic window assembly can effectively function as an opaque shade for a window when desired.

While first conductive coating 53 provides fog preventing electrochromic pane assembly 40 with a heated pane, second and third conductive coatings provide fog preventing electrochromic pane assembly 40 with electrochromic panes, capable of changing the transmittance of electrochromic medium 67 upon application of electrical potential thereto. As such, fog preventing electrochromic assembly 10 can provide both anti-fogging properties and electrochromic properties to window assembly 10 in a single unit. An aircraft window assembly can, therefore, be easily converted to include an electrochromic assembly portion 60 without significant weight associated therewith, since anti-fog assembly portion 41 serves as one substrate of the electrochromic assembly, and only one additional substrate or glass panel need be added to define the electrochromic cell. Moreover, since each additional layer incorporated into such an aircraft window assembly adds an additional surface, which can cause reflective distortion, it is desirable to limit the number of layers in such an aircraft window as much as possible, without deleteriously affecting the desired characteristics of the assembly. The window assembly of the present invention minimizes the reflective distortion by creating the electrochemical cell with only one additional substrate, while maintaining the anti-fog properties.

Such an aircraft window assembly has the further advantages of fog prevention due to the conductive layer present on the opposite surface of anti-fog assembly portion 41. Including such an electrochromic assembly also eliminates the need for a window shade, as is commonly used in aircraft window applications. Further, as the electrochromic cell is defined by a portion of the existing aircraft window, the electrochromic window assembly will meet the regulatory and safety requirements of the original aircraft window without the need for further regulatory review.

Figure 4:
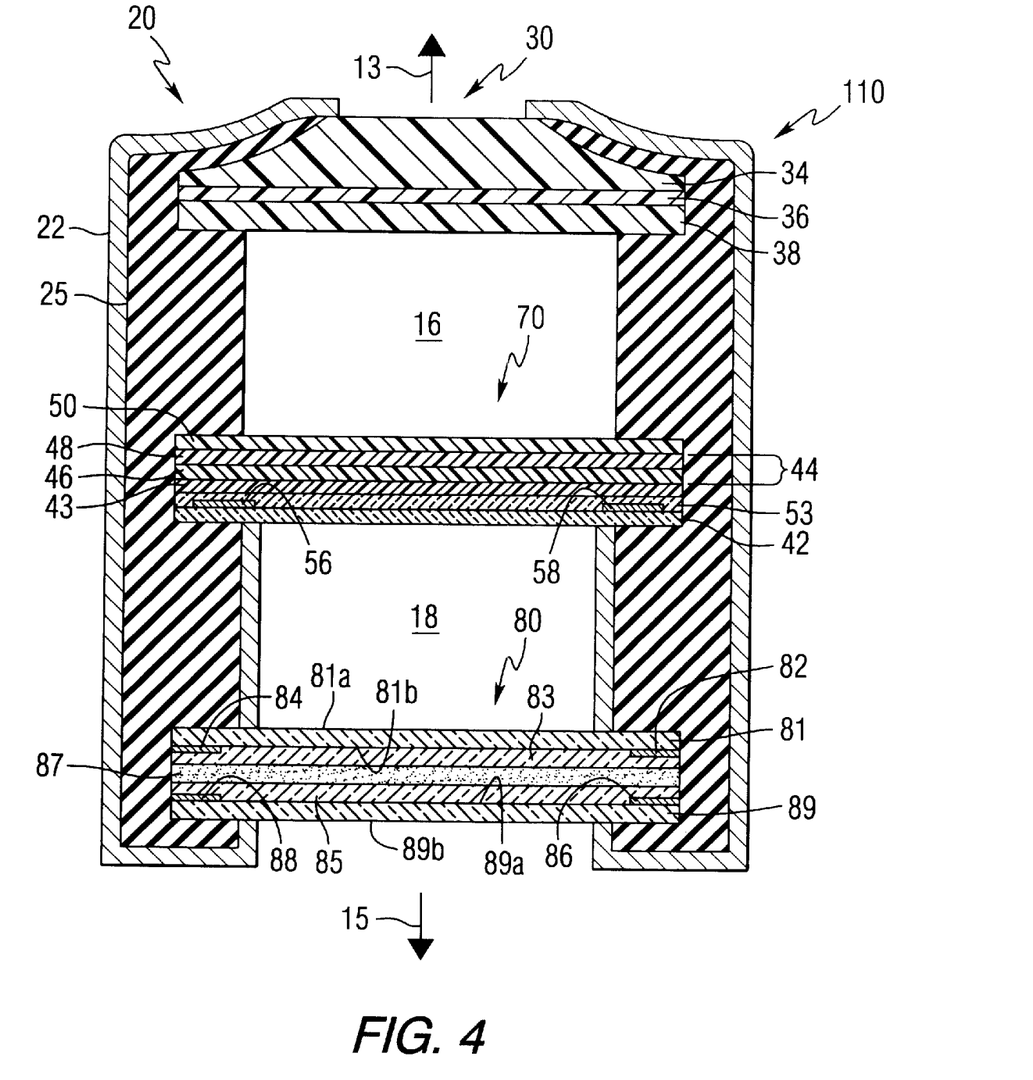

In an alternate nonlimiting embodiment of the present invention as shown in FIG. 4, the anti-fog assembly portion 41 and electrochromic assembly portion 60 of fog preventing electrochromic pane assembly are provided as separate and distinct pane assemblies. More particularly, electrochromic aircraft window assembly 110 includes outboard pane assembly 30, intermediate fog preventing assembly 70, and electrochromic pane assembly 80. A first space or chamber 16 is provided between outboard pane assembly 30 and intermediate fog preventing assembly 70, while a second space or chamber 18 is provided between intermediate fog preventing assembly 70 and electrochromic pane assembly 80. In the manner as discussed earlier with respect to the embodiment of the invention shown in FIG. 2, chambers 16 and/or chamber 18 can be sealed or unsealed, and further can be fully or partially filled with an insulating gas such as but not limited to, air, argon, krypton or mixtures thereof.

Intermediate fog preventing assembly 70 is constructed substantially as discussed above with reference to anti-fog assembly portion 41 with reference to FIG. 3. In the embodiment shown in FIG. 4, however, the electrochromic pane assembly 80 is not adhered directly to the fog preventing assembly 70, but is instead spaced therefrom.

Also, electrochromic pane assembly 80 is constructed substantially as discussed above with reference to electrochromic assembly portion 60, shown in FIG. 3, albeit spaced from the anti-fog assembly portion. More particularly, electrochromic pane assembly 80 includes first substrate 81 and second substrate 89. First substrate 81 includes outer surface 81a and inner surface 81b and second substrate 89 includes outer surface 89a and inner surface 89b, with inner surface 81b of first substrate 81 facing and being spaced from outer surface 89a of second substrate 89. Inner surface 81b of first substrate 81 is provided with a conductive coating 83 and outer surface 89a of second substrate 89 is provided with a conductive coating 85 thereon, wherein conductive coating 85 is spaced from conductive coating 83 to provide a space therebetween. Inner surface 89b of second substrate 89 represents the innermost portion of window assembly 110. Electrochromic medium 87 is contained within the space between first substrate 81 and second substrate 89.

Electrochromic pane assembly 80 is provided with facilities 82 and 84 that are in electrical contact with conductive coating 83, as well as facilities 86 and 88 in electrical contact with conductive coating 85, in a similar manner similar to the facilities discussed earlier and shown in FIGS. 2 and 3. Although not required, facilities 82, 84, 86 and 88 can be bus bars similar to the electrically contacting facilities discussed earlier.

By positioning the electrochromic pane assembly 80 spaced from the fog preventing assembly 70, as shown in FIG. 4, additional sound proofing of the interior aircraft can be achieved, due to the additional chamber 18.

In one nonlimiting embodiment of the present invention, at least one of the outer pane assembly 30, the fog preventing electrochromic pane 40, the intermediate fog preventing assembly 70 and the electrochromic pane assembly 80 are curved or contoured. FIG. 5 shows a particular nonlimiting embodiment of the present invention in which all the vision components of the electrochromic window assembly are curved or contoured. Such curved or contoured nature permits the window assembly to follow the overall shape or contour of the aircraft. Moreover, by providing all of the elements of the window assembly in such a curved nature, reflective distortion through the window assembly is substantially limited.

Based on the above, in one nonlimiting embodiment of the present invention, an electrochromic aircraft window assembly comprises an outboard pane assembly and an electrochromic pane assembly spaced from the outboard pane assembly and defining a chamber therebetween. The electrochromic pane assembly comprises a first substrate having first and second surfaces, and a second substrate having first and second surfaces, wherein the second surface of the first substrate is facing and spaced from the first surface of the second substrate. The first and second substrates form a chamber of generally uniform thickness therebetween. A first conductive layer is on the second surface of the first substrate and a second conductive layer is on the first surface of the second substrate. The chamber formed between the first and second substrates includes an electrochromic medium that is in contact with the first and second conductive layers. The luminous transmittance of the electrochromic medium varies upon application of electrical current to the conductive layers. Facilities for applying electrical current to the first and second conductive layers to cause the luminous transmittance of the electrochromic medium to change are also provided. The assembly further comprises at least one additional assembly selected from a distortion reducing assembly, a fogging reducing assembly and a sound dampening assembly. Although not required, these assemblies can be similar in configuration to the distortion reducing, fog reducing and sound dampening assemblies discussed earlier.

The glass sheets useful as bent substrates in the present invention can be bent by any method known in the art and matched with another preformed curved glass sheet whose curvature closely matches. In simultaneous shaping of multiple glass sheets, it is common practice to use bending irons having contoured, metal shaping rails to support two or more flat glass sheets about their periphery and convey the irons and glass sheets through a heating lehr. The heating of the sheets within the lehr is controlled to provide the desired sag configuration of the sheets. More particularly, as the temperature of the glass sheets increases and approaches the glass sheet heat softening temperature, the sheets begin to sag under the force of gravity and conform about their periphery to the contours of the rails. The unsupported portions of the glass sheets will also sag under the force of gravity to a desired configuration. The bending iron with the shaped glass sheets is then conveyed out of the lehr to controllably cool the glass and set the glass shape, e.g. through annealing and cooling zones of the lehr to minimize stresses in the glass. This bending method assures a closer match of the curvature between the sheets that are bent together. Although not required, flexible polycarbonate sheets can be formed in a similar manner.

An example of one such heating lehr is a tunnel type lehr disclosed in U.S. Pat. No. 4,804,397 to Stas et al., and U.S. Pat. No. 4,687,501 to Reese the disclosures of both are herein incorporated by reference, wherein the bending irons are continuously conveyed through the lehr. Other well known heating lehrs include stop-and-go type heating lehrs, wherein the glass sheets are supported on shaping rails within separate heating chambers that are sequentially conveyed through the lehr to heat and shape the glass sheets.

Also curved or bent glass sheets, panels or substrates can be produced by well known press bending techniques, wherein flat glass sheets are heated to the softening point of the glass and then pressed or shaped to the desired curvature between male and female mold members having complementary shaping surfaces. After bending, the sheets are cooled in a controlled manner to either anneal or temper the glass as dictated by their intended end use. Such press bending can suitably be carried out with the sheets oriented vertically, horizontally or obliquely.

Example embodiments of the present invention have now been described. It will be appreciated that these examples are merely illustrative of the invention. Many variations and modifications of the invention would be apparent to those skilled in the art and are intended to be included within the scope of the following claims.

What is claimed is:

1. An electrochromic aircraft window assembly comprising:
   a) an outboard pane assembly;
   b) an electrochromic pane assembly comprising first and second spaced substrates defining a chamber therebetween and an electrochromic medium contained in said chamber, said electrochromic medium having a luminous transmittance that varies upon application of an electrical potential through said electrochromic medium; and
   c) an intermediate pane assembly having anti-fogging properties, wherein said outboard pane assembly and said electrochromic pane assembly have facing surfaces and said intermediate pane assembly is interposed between and spaced from said outboard pane assembly and said electrochromic pane assembly, said intermediate pane assembly preventing fogging of said respective facing surfaces of said outboard pane assembly and said electrochromic pane assembly.

2. The window assembly according to claim 1, wherein said intermediate pane assembly includes a first conductive coating and facilities for applying electrical current to said first conductive coating to heat said first conductive coating, thereby providing said anti-fogging properties.

3. The window assembly according to claim 2, further comprising a second conductive coating on a surface of said first substrate, a third conductive coating on a surface of said second substrate, and facilities for applying electrical current to said second and said third conductive coatings and impress said electrical potential through said electrochromic medium to cause said luminous transmittance of said electrochromic medium to vary, said second conductive coating and said third conductive coating on facing surfaces of said first and second substrates and being spaced from each other.

4. The window assembly according to claim 3, wherein said first, second and third conductive coatings are selected from metal and metal oxide coatings.

5. The window assembly according to claim 4, wherein said first, second and third conductive coatings are selected from fluorine-doped tin oxide, indium tin oxide, antimony-doped tin oxide, silver, gold, and combinations thereof.

6. The window assembly according to claim 3, wherein said electrical current is applied to said first conductive coating at a power density ranging from 0.25 to 0.40 watts/in$^2$ and said electrical current is applied to said second and said third conductive coatings at a power density ranging from 0.0001 to 0.01 watts/in$^2$.

7. The window assembly according to claim 1, wherein said electrochromic medium comprises at least one anodic electrochromic compound and at least one cathodic electrochromic compound, and wherein application of electrical potential to said electrochromic medium causes simultaneous oxidation of said anodic electrochromic compound and reduction of said cathodic electrochromic compound thereby causing reduced luminous transmittance.

8. The window assembly according to claim 7 wherein, said electrochromic medium is self-erasing upon elimination or reduction of electrical potential to said electrochromic medium.

9. The window assembly according to claim 1, wherein luminous transmittance of said electrochromic pane assembly of said window assembly varies from a minimum LTA ranging from 1 to 20 percent and a maximum LTA ranging from 60 to 80 percent.

10. The window assembly according to claim 1, wherein said first and second spaced substrates are glass.

11. The window assembly according to claim 1, wherein said outboard pane assembly comprises a laminated pane comprising an inboard acrylic layer, an outboard acrylic layer and an interlayer interposed between and adhering together said inboard acrylic layer and said outboard acrylic layer.

12. The window assembly according to claim 11, wherein said inboard acrylic layer is stretched acrylic ranging from 0.2 to 0.4 inches thick, said outboard acrylic layer is stretched acrylic ranging from 0.2 to 0.4 inches thick, and said interlayer is polyvinyl butyral ranging from 0.025 to 0.05 inches thick.

13. The window assembly according to claim 1, wherein said intermediate pane assembly comprises a vibration dampening/sound absorbing pane assembly laminate having a base substrate, an adhesive interlayer deposited over said base substrate and a sound dampening material layer deposited over said adhesive interlayer and adhered to said base substrate by said adhesive layer.

14. The window assembly according to claim 13, wherein said sound dampening material layer is a laminate comprising a polyvinyl butyral layer and a polyester disposed over and in contact with said polyvinyl butyral layer.

15. The window assembly according to claim 14, wherein a conductive coating is interposed between said adhesive layer and said base substrate of said vibration dampening/sound absorbing pane assembly.

16. An electrochromic aircraft window assembly comprising:
a) an outboard pane assembly;
b) a vibration dampening/sound absorbing pane assembly comprising a laminate comprising a base substrate, an adhesive interlayer deposited over a surface of said base substrate, a sound dampening material layer deposited over said adhesive interlayer and adhered to said base substrate by said adhesive layer, and a first conductive coating interposed between said adhesive layer and said base substrate;
c) an electrochromic pane assembly comprising a first substrate having a second conductive coating on a surface thereof and a second substrate having a third conductive coating on a surface thereof, said first and said second substrates spaced from each other with said second and said third conductive coatings facing each other to define a chamber therebetween, said electrochromic pane assembly further comprising an electrochromic medium contained in said chamber, said electrochromic medium having a luminous transmittance that varies upon application of electrical current to said second and said third conductive coatings to establish an electrical potential through said electrochromic medium; and
d) a spacer frame assembly for retaining said outboard pane assembly, said vibration dampening/sound absorbing pane assembly and said electrochromic pane assembly in spaced-apart generally parallel facing relationship with said vibration dampening/sound absorbing pane assembly positioned between said outboard pane assembly and said electrochromic pane assembly, said spacer frame assembly providing a first chamber between said outboard pane assembly and said vibration dampening/sound absorbing pane assembly and second chamber between said vibration dampening/sound absorbing pane assembly and said electrochromic pane assembly.

17. The window assembly according to claim 16, wherein said vibration dampening/sound absorbing pane assembly is retained by said spacer frame assembly with said sound dampening material layer disposed toward said outboard pane assembly.

18. The window assembly according to claim 16, further comprising facilities for applying electrical current to said first conductive coating to heat said first conductive coating and facilities for applying said electrical current to said second and third conductive coatings to vary the luminous transmittance of said electrochromic medium.

* * * * *